C. E. Prétat. Sheet 1. 2 Sheets.
Photographic Album.
Nº 44890. Patented Nov. 1. 1864.

Witnesses.

Inventor.
C. E. Prétat

C. E. Prétat.
Photographic Album.
N°. 44890. Patented Nov. 1. 1864.
Fig. 8.     Fig. 9.     Fig. 10.
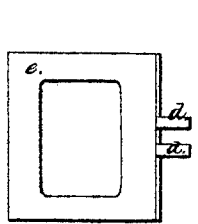
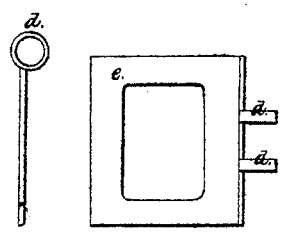
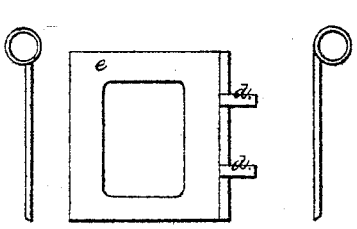
Fig. 11.     Fig. 12.     Fig. 13.     Fig. 14.
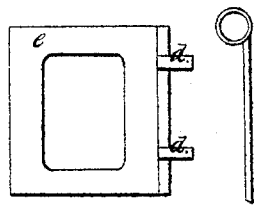
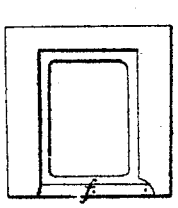
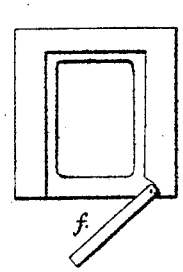
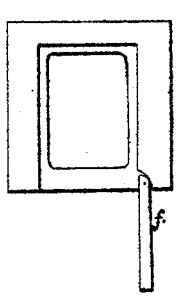
Fig. 15.   Fig. 16.   Fig. 17.   Fig. 18.     Fig. 19.
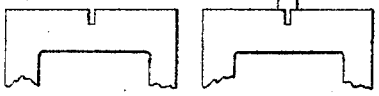
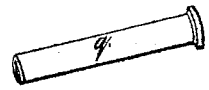
Witnesses.            Inventor.
C. E. Prétat

UNITED STATES PATENT OFFICE.

C. E. PRÉTAT, OF NEW YORK, N. Y.

PHOTOGRAPHIC ALBUM.

Specification forming part of Letters Patent No. 44,890, dated November 1, 1864.

*To all whom it may concern:*

Be it known that I, CHARLES E. PRÉTAT, a citizen of the United States, residing in the city, county, and State of New York, have invented and discovered certain Improvements in the Construction of Photographic Albums, of which the following is a specification.

My improvements consist, first, in the construction, in the manner herein described, of photographic albums in metal of such size that they may be attached to bracelets, watch-chains, finger-rings, or brooches, and used and worn as personal ornaments; and, second, in the method of attaching the leaves of photographic albums to the covers, and of securing the pictures in place, which are applicable to albums of any size or material.

Figure 1:
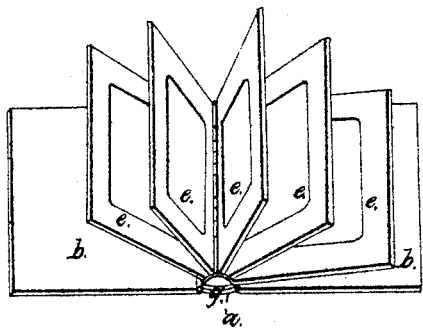
Figure 2:
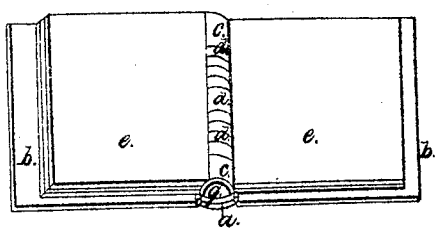
Figure 3:
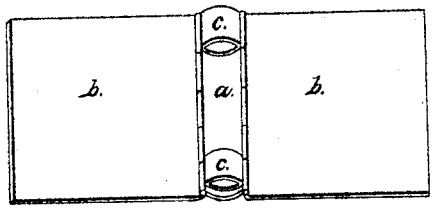
Figure 4:
Figure 5:
Figure 6:
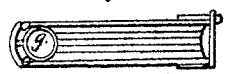

The improvements are fully shown in the annexed drawings. Figure 1 is a perspective view of the album, with leaves partly open. Fig. 2 is a perspective view with leaves opened fully. Fig. 3 is a view of the back and sides, the leaves being removed. Fig. 4 is an end view of back and sides. Fig. 5 is an end view of album with leaves opened. Fig. 6 is an end view with leaves closed. Figs. 7, 8, 9, 10, and 11 are front and end views of the leaves separately. Figs. 12, 13, and 14 are views in section of the leaves, showing the method of inserting and securing the picture. Figs. 15, 16, 17, and 18 show the method of forming the joint by which the leaves are secured in place. Fig. 19 shows the pin upon which the leaves are adjusted when in place.

Figure 7:
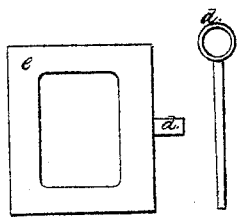

The method of construction is as follows: The back $a$ and sides $b\ b$ are hinged together, as shown in Fig. 3. On the inside of the back two sockets, $c\ c$, are attached, as shown in Figs. 3 and 4. The leaves intended to hold the pictures, which in small sized albums should be of metal, are constructed as follows: Two plates are fastened together, with openings in the middle for the exhibition of the pictures, and having a narrow aperture at the top or bottom for the admission of the pictures, this aperture being fitted with a thin strip of metal, $f$, hinged at one end, so that it can be opened or closed at pleasure. (See Figs. 12, 13, 14.) The inner edge of each leaf is cut, so that its section corresponds to the curve of the surface of the sockets $c\ c$. The leaves $e\ e$ are secured in place by rings $d\ d$, attached to their inner edges. These rings are equal in diameter to the sockets $c\ c$, and are attached to the leaves respectively in the positions shown in Figs. 7, 8, 9, 10, and 11; Fig. 7 showing the middle leaf, 8 and 9 those next the middle on each side, and 10 and 11 the outer leaves. Care must be taken to attach the rings to the leaves in the proper places, regard being had to the positions the leaves are to occupy in the book, otherwise they will not open readily without bending. A hollow pin, $g$, passing through the sockets $c\ c$ and rings $d\ d$, secures the leaves in place.

The rings $d\ d$ are attached to the leaves as follows: A cut is made through the side of the ring, (see Fig. 15,) and a thin plate of metal soldered unto it, a corresponding cut is then made in the leaf, and the piece of metal attached to the ring soldered into it. (See Figs. 16 and 17). The superfluous metal is then trimmed away. By this method a firmer and more solid joint is formed than can be made by soldering the ring directly to the leaf.

It should be observed that the album may be made in any desired form, as circular, oval, &c.

What I claim as my invention and discovery, and desire to secure by Letters Patent, is—

1. The construction of a photographic album, substantially as above described, in which all the leaves are hinged and turn upon a single pin or pivot, and also the arrangement for opening and closing the apertures for the admission of the pictures.

2. The construction of the joint by which the leaves are attached to the hinges, as above described.

C. E. PRÉTAT.

Witnesses:
SAML. J. GLASSEY,
J. H. DAPER.